United States Patent
Kamada

(10) Patent No.: US 10,279,554 B2
(45) Date of Patent: May 7, 2019

(54) TIRE CURE METAL MOLD

(71) Applicant: TOYO TIRE & RUBBER CO., LTD., Itami-shi, Hyogo (JP)

(72) Inventor: Nobuyuki Kamada, Itami (JP)

(73) Assignee: Toyo Tire Corporation, Itami-shi (JP)

( * ) Notice: Subject to any disclaimer, the term of this patent is extended or adjusted under 35 U.S.C. 154(b) by 0 days.

(21) Appl. No.: 16/025,447

(22) Filed: Jul. 2, 2018

(65) Prior Publication Data
US 2019/0022965 A1 Jan. 24, 2019

(30) Foreign Application Priority Data

Jul. 18, 2017 (JP) .................................. 2017-138719

(51) Int. Cl.
*B29D 30/06* (2006.01)

(52) U.S. Cl.
CPC .. *B29D 30/0606* (2013.01); *B29D 2030/0613* (2013.01)

(58) Field of Classification Search
CPC ................... B29D 30/0606; B29D 2030/0613
See application file for complete search history.

(56) References Cited

U.S. PATENT DOCUMENTS

| | | | | |
|---|---|---|---|---|
| 3,570,571 A | * | 3/1971 | Riches | B29D 30/0606 152/209.21 |
| 6,264,453 B1 | * | 7/2001 | Jacobs | B22F 5/00 152/DIG. 3 |
| 6,408,911 B1 | * | 6/2002 | Tanabe | B29D 30/0606 152/209.18 |
| 9,022,083 B2 | * | 5/2015 | Voss | B29D 30/0606 152/209.18 |
| 9,205,613 B2 | * | 12/2015 | Montbel | B29D 30/0606 |
| 2011/0180191 A1 | * | 7/2011 | Christenbury | B29D 30/0606 152/209.18 |

FOREIGN PATENT DOCUMENTS

| | | | |
|---|---|---|---|
| JP | 3-90317 | * | 4/1991 |
| JP | 2005-280316 A | | 10/2005 |

* cited by examiner

*Primary Examiner* — James P Mackey
(74) *Attorney, Agent, or Firm* — Westerman, Hattori, Daniels & Adrian, LLP

(57) ABSTRACT

A tire cure metal mold has a plurality of blades for forming a sipe provided in a protruding manner on a tread forming surface. The tire cure metal mold has a first blade extending along a first direction, a second blade extending along a second direction intersecting the first direction and a protrusion portion. The protrusion portion is formed by a local protrusion of the tread forming surface and comes into contact with a side surface of the first blade and an end surface of the second blade facing to the side surface of the first blade.

10 Claims, 7 Drawing Sheets

TIRE CURE METAL MOLD

BACKGROUND OF THE INVENTION

Field of the Invention

The present invention relates to a tire cure metal mold in which a plurality of blades for forming a sipe are provided in a protruding manner on a tread forming surface.

Description of the Related Art

Conventionally, in order to improve a traveling performance on a wet road surface and a snowy and icy road surface, there has been known a tire in which a cut called as a sipe is formed on a tread surface. The sipe is formed by a thin-plate blade which is installed to a tread forming surface. In general, the tread forming surface is formed by a metal material such as an aluminum alloy which is a base material of a tire cure metal mold (which may be hereinafter referred simply to as "metal mold"), and the blade is formed by a metal material such as a stainless which is different from the base material of the metal mold.

In order to form a branch sipe which extends while being branched, two blades are used, and a branch shape is formed by butting a side surface of one blade with an end surface of the other blade. Since it is hard to form the blade having the branch shape by itself, two blades are normally combined as mentioned above. However, it is hard to butt the blades without forming any gap. If any rubber enters into a gap at a position where the blades are butted when curing the tire, a thin rubber burr is formed in an inner portion of the branch sipe.

There can be thought that the side surface of the one blade is strongly pressed against the end surface of the other blade for preventing the gap from being formed. However, in this case, it is necessary to previously butt the blades each other strongly in a plaster casting mold which is used for casting the metal mold. Further, in the case that the metal mold is casted by using the plaster casting mold, tilting or displacement of the blade may be caused due to distortion generated by difference in a coefficient of thermal expansion when the tread forming surface is constricted. As a result, there is a risk that a gap is generated at the position where the blades are butted each other.

Patent document 1 describes a tire cure metal mold in which a casting portion is formed by butting with an end surface of a blade. This is a technique of intending to improve a durability of the casting portion in relation to a blasting process by covering the end surface of the casting portion with the end surface of the blade, and does not suggest any solving means against the problem mentioned above about the butting position between the blades.

PRIOR ART DOCUMENT

Patent Document

Patent Document 1: JP-2005-280316 A

SUMMARY OF THE INVENTION

Problem to be Solved by the Invention

The present invention is made by taking the above actual condition into consideration, and an object of the present invention is to provide a tire cure metal mold which can appropriately form a branch sipe by preventing a gap from being formed at a position where blades are butted each other.

Means for Solving the Problem

The present invention provides a tire cure metal mold in which a plurality of blades for forming a sipe are provided in a protruding manner on a tread forming surface, the tire cure metal mold comprising a first blade which extends along a first direction, a second blade which extends along a second direction intersecting the first direction, and a protrusion portion which is formed by a local protrusion of the tread forming surface and comes into contact with a side surface of the first blade and an end surface of the second blade facing to the side surface of the first blade.

In the tire cure metal mold, the branch sipe is formed by the first blade and the second blade. Since between the side surface of the first blade, and the end surface of the second blade facing to the side surface of the first blade, the protrusion portion coming into contact with them is interposed, it is not necessary to directly butt the blades each other. Further, the protrusion portion is formed by the local protrusion of the tread forming surface, and can absorb the distortion which is generated due to the difference in the coefficient of thermal expansion when casting the metal mold. Therefore, there is no disadvantage even if the blades displace relatively. As a result, it is possible to prevent the gap from being formed at the butting position between the blades, and it is possible to appropriately form the branch sipe.

The first blade may be arranged in an area forming a shoulder land portion line which is positioned in an outermost side in a tire width direction among a plurality of land portion lines, and may extend along a tire circumferential direction which is the first direction, and wherein the second blade may be arranged in an outer side in the tire width direction than the first blade, and may extend along the tire width direction which is the second direction. In the tire in which the branch sipe corresponding to the first and second blades are formed in the shoulder land portion line, an improvement of a drainage performance can be achieved.

It is preferable that a thickness of the protrusion portion measured in a thickness direction of the second blade is larger than a thickness of the second blade. As a result, a durability of the protrusion portion in relation to a blasting process such as a shot blast can be enhanced.

It is preferable that a length of the protrusion portion measured in a length direction of the second blade is equal to or less than 0.7 times of the maximum height of the second blade. Since the length of the protrusion portion is made appropriately small as mentioned above, the thermal expansion can be suppressed in the length direction of the protrusion portion when curing the tire, and any excessive load is not applied to the protrusion portion which is sandwiched by the side surface of the first blade and the end surface of the second blade.

It is preferable that a height of the protrusion portion measured in a tire diametrical direction is equal to or smaller than the maximum height of the second blade. According to the structure mentioned above, it is possible to appropriately secure a thickness of the tread rubber at a position where the protrusion portion is formed.

The protrusion portion is preferably in contact with the end surface of the second blade and the peripheral side surface thereof. According to the structure mentioned above, it is possible to enhance the durability of the second blade and the protrusion portion in relation to the withdrawal resistance when demolding the tire.

DETAILED DESCRIPTION OF THE PREFERRED EMBODIMENTS

Figure 1:
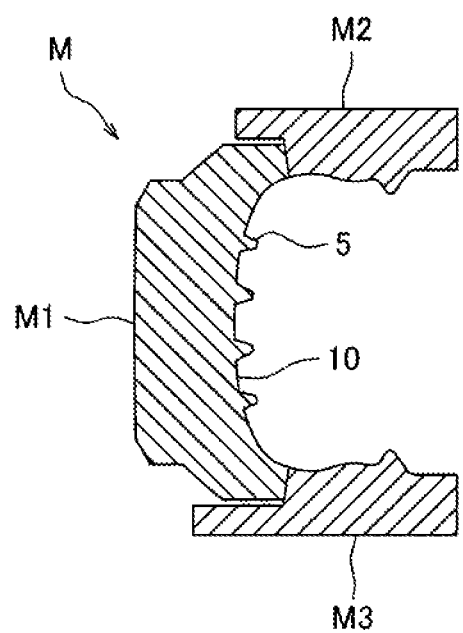
FIG. 1 is a vertical cross sectional view schematically showing an example of a tire cure metal mold according to the present invention.

A description will be given of embodiments according to the present invention with reference to the accompanying drawings. FIG. 1 shows a schematic cross sectional view of a tire cure metal mold M (which may be hereinafter referred simply to as "metal mold M") used for cure molding a pneumatic tire. When cure molding the tire, an uncured tire (not shown) is set to the metal mold M by setting a tire axial direction up and down. A tread surface of the uncured tire is pressed against a tread forming surface 10 of the metal mold M. The metal mold M is provided with a tread mold portion M1 which forms the tread surface of the tire, and side mold portions M2 and M3 which form a surface of a side wall portion.

The tread forming surface 10 is formed by cast metals, for example, of an aluminum alloy (AC4D, AC7A, etc.). The tread forming surface 10 has a plurality of (four in the present embodiment) projections 5 for forming a main groove, and a projection 6 (refer to FIG. 3) for forming a lateral groove extending in a direction intersecting the main groove, and these projections are formed by casting. The projection 5 extends along a tire circumferential direction, and may be inclined in relation to the tire circumferential direction. A plurality of (five in the present embodiment) areas comparted by the projections 5 respectively form areas which form land portion lines of ribs and/or block rows.

Figure 2:
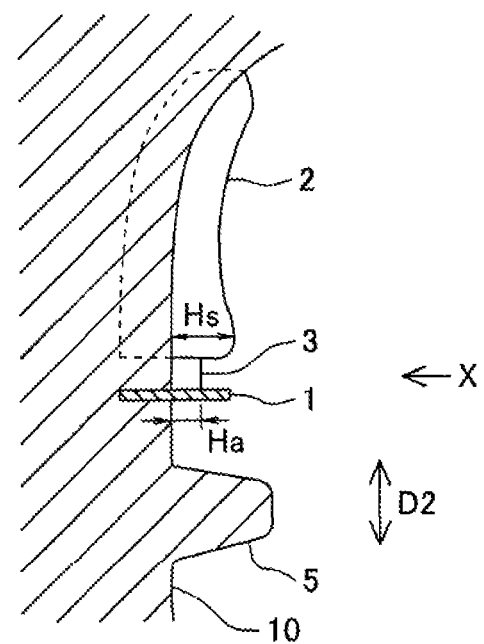
FIG. 2 is an enlarged view of a substantial part in FIG. 1.
Figure 3:
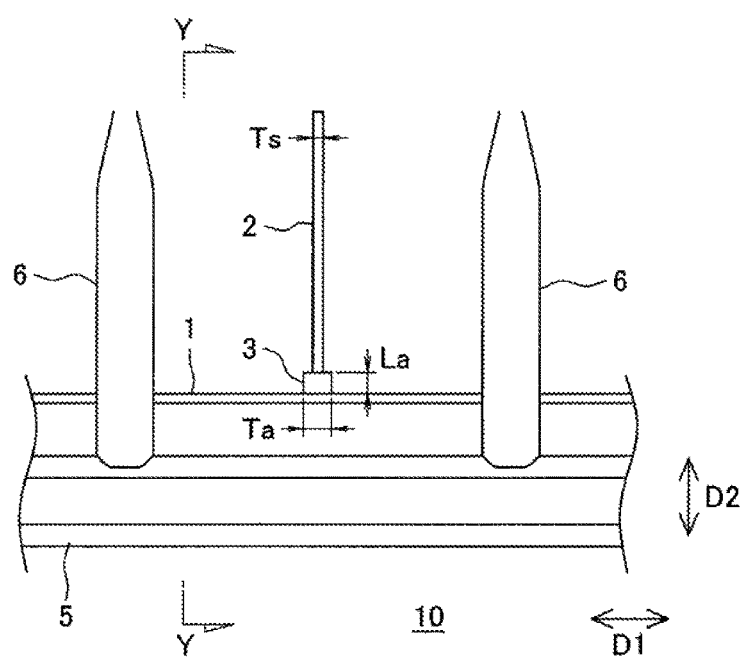
FIG. 3 is a view as seen from an arrow X in FIG. 2.

FIG. 2 is an enlarged view of a substantial part in FIG. 1, and corresponds to a cross section as seen from an arrow Y-Y in FIG. 3. FIG. 2 shows an area forming a shoulder land portion which is positioned in an outermost side in a tire width direction among the plurality of land portion lines. FIG. 3 is a view as seen from an arrow X in FIG. 2 when viewing the area forming the shoulder land portion line from an inner side in the tire diametrical direction. In the metal mold M, a plurality of blades for forming a sipe are provided in a protruding manner on a tread forming surface 10. The blade is constructed by a thin-plate member, and is installed to the tread forming surface 10. The blade is formed by a material which is different from a base material of the tread forming surface 10, for example, a stainless steel (SUS303, SUS304, etc.). Two blades are described in FIGS. 2 and 3, however, a lot of blades are arranged in the areas which are not illustrated.

The metal mold M is provided with a blade 1 (corresponding to a first blade) which extends along a first direction D1, a blade 2 (corresponding to a second blade) which extends along a second direction D2 intersecting the first direction D1, and a protrusion portion 3 which is formed by a local protrusion of the tread forming surface 10, and comes into contact with a side surface of the blade 1 and an end surface of the blade 2 facing to the side surface of the blade 1. The side surface of the blade 1 and the end surface of the blade 2 are separated from each other, however, the protrusion portion 3 interposing between them connects the both. The protrusion portion 3 is made of the base material of the tread forming surface 10 and is formed by casting.

According to the metal mold M, a branch sipe extending while branching is formed by the blades 1 and 2. Since the protrusion portion 3 is interposed between the side surface of the blade 1 and the end surface of the blade 2, it is not necessary to directly butt the blades each other. Further, the protrusion portion 3 is formed by locally protruding the tread surface 10 and is formed by casting as mentioned above. When casting the metal mold M, distortion generated due to a difference in coefficient of thermal expansion between the tread forming surface 10 and the blades 1 and 2 is absorbed by the protrusion portion 3. As a result, there is no disadvantage even if the blade 1 and the blade 2 are relatively displaced. Therefore, it is possible to prevent a gap from being formed at a position where the blades are butted, and it is possible to appropriately form the branch sipe.

In the present embodiment, the blade 1 is arranged in an area which forms a shoulder land portion line, and extends along a tire circumferential direction (a lateral direction in FIG. 3) corresponding to the first direction D1. The blade 1 extends in parallel to the tire circumferential direction, however, may be inclined to the tire circumferential direction. Further, the blade 2 is arranged in an outer side in the tire width direction than the blade 1, and extends along the tire width direction (a vertical direction in FIG. 3) corresponding to the second direction D2. The blade 2 extends in parallel to the tire width direction, however, may be inclined to the tire width direction.

In the tire obtained by using the metal mold M according to the present embodiment, since the branch sipe extending along the tire circumferential direction and extending while branching to the outer side in the tire width direction is formed in the shoulder land portion line of the tire, improvement of a drainage performance can be achieved. In the present embodiment, both end surfaces of the blade 1 are in contact with the projection 6, however, one or both of the end surfaces may be out of touch with the projection 6. The shoulder land portion line is constructed as a block row which is formed by a plurality of blocks comparted by lateral grooves formed by the projection 6, however, is not limited to this structure.

A thickness Ta of the protrusion portion 3 measured in a thickness direction of the blade 2 is preferably larger than a thickness Ts of the blade 2, that is, Ts<Ta. As a result, a durability of the protrusion portion 3 in relation to a blasting process such as a shot blast can be enhanced. The thickness Ts of the blade 2 is set to be comparatively small, for example, less than 2 mm. Therefore, in the case that the thickness Ta is equal to or smaller than the thickness Ts, a strength of the protrusion portion 3 comes short, and there is a risk that a disadvantage that the protrusion portion 3 gets chipped when washing according to the blasting process may be generated. Since the blades 1 and 2 are normally formed by a raw material which is harder than the base material of the tread forming surface 10, the blades 1 and 2 are safe from lack of strength.

In the light of enhancement of the durability of the protrusion portion 3, the thickness Ta of the protrusion portion 3 is preferably equal to or more than 1.1 times of the thickness Ts of the blade 2, and more preferably equal to or more than 1.2 times. Further, in the light of suppression of sense of discomfort on an outer appearance in the formed branch sipe, the thickness Ta of the protrusion portion 3 is preferably equal to or less than 2.0 times of the thickness Ts of the blade 2, and more preferably equal to or less than 1.5 times.

A length La of the protrusion portion 3 measured in a length direction of the blade 2 is preferably equal to or less than 0.7 times of the maximum height Hs of the blade 2, and more preferably equal to or less than 0.5 times. The thermal expansion of the protrusion portion 3 in the length direction can be suppress at the curing time of the tire by making the length La of the protrusion portion 3 appropriately small as mentioned above, and any excessive load is not applied to the protrusion portion 3 which is sandwiched by the side surface of the blade 1 and the end surface of the blade 2. The maximum height Hs is the maximum value of the height of the blade 2 which is measured in a tire diametrical direction on the basis of the tread forming surface 10. In the light of appropriately separating the side surface of the blade 1 and the end surface of the blade 2, the length La is preferably equal to or more than 0.2 times of the maximum height Hs and more preferably equal to or more than 0.3 times.

A height Ha of the protrusion portion 3 measured in the tire diametrical direction is preferably equal to or smaller than the maximum height Hs of the blade 2. According to the structure mentioned above, it is possible to appropriately secure a thickness of the tread rubber of the tire at a position of forming the protrusion portion 3. More specifically, since the thickness of the tread rubber of the tire becomes too small in the case that the height Ha goes beyond the maximum height Hs, there is a risk of generation of a cord exposure. The maximum height Hs of the blade 2 is, for example, between 6 and 10 mm.

Since the protrusion portion 3 generates a temporal change by repeating expansion and constriction caused by the cure molding of the tire, it is preferable to make the height Ha of the protrusion portion 3 smaller than the maximum height Hs of the blade 2 for enhancing a durability of the protrusion portion 3 in relation to the temporal change mentioned above. Further, in the light of forming the protrusion portion 3 into a block shape so as to secure a strength thereof, each of the height Ha and the length La of the protrusion portion 3 is preferably equal to or larger than the thickness Ts of the blade 2 (for example, equal to or more than twice of the thickness Ts).

Figure 4:
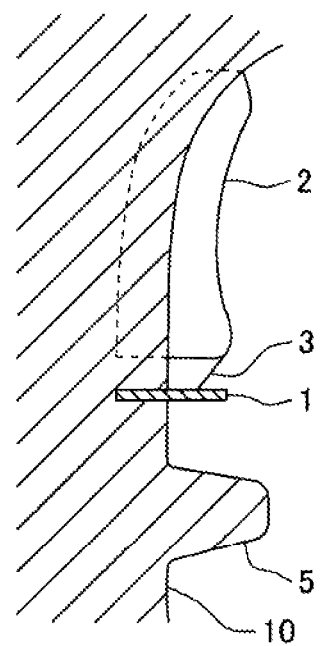
FIG. 4 is a view showing a modified example of a protrusion portion.

As shown in FIG. 2, in the present embodiment, there is shown the example in which the height of the protrusion portion 3 is fixed along the length direction of the blade 2, however, the structure is not limited to this. For example, it is possible to employ a structure in which the height of the protrusion portion 3 is enlarged toward the blade 2, as shown in FIG. 4. According to the structure mentioned above, the discharged water flow caused by the branch sipe is improved, and it is possible to increase a contact area between the end surface of the blade 2 and the protrusion portion 3. In this case, the thickness Ha of the protrusion portion 3 mentioned above is measured at the position of the end surface of the blade 2.

Figure 5:
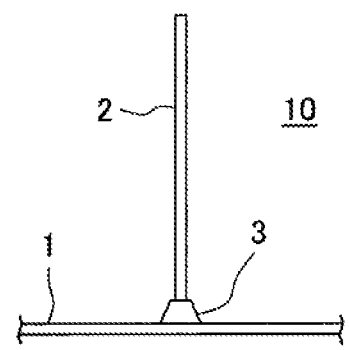
FIG. 5 is a view showing a modified example of a protrusion portion.

As shown in FIG. 3, in the present embodiment, there is shown the example in which the thickness of the protrusion portion 3 is fixed along the length direction of the blade 2, however, the structure is not limited to this. For example, it is possible to employ a structure in which the thickness of the protrusion portion 3 becomes smaller toward the blade 2, as shown in FIG. 5. According to the structure mentioned above, the discharged water flow caused by the branch sipe is improved, and it is possible to suppress the sense of discomfort on the outer appearance in the formed branch sipe. In this case, the thickness Ta of the protrusion portion 3 mentioned above is measured at the position of the end surface of the blade 2.

Figure 6:
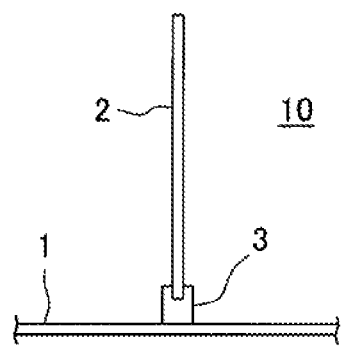
FIG. 6 is a view showing a modified example of a protrusion portion.

As shown in FIG. 3, in the present embodiment, there is shown the example in which the protrusion portion 3 comes into contact with the blade 2 only in its end surface, however, the structure is not limited to this. For example it is possible to employ a structure in which the protrusion portion 3 comes into contact with the end surface of the blade 2 and its peripheral side surface, as shown in FIG. 6. According to the structure mentioned above, the end portion of the blade 2 is formed into such a shape as to be held by the protrusion portion 3, and it is possible to enhance the durability of the blade 2 and the protrusion portion 3 in relation to the withdrawal resistance at the demolding time of the tire. In this case, the length La of the protrusion portion 3 mentioned above is measured between the side surface of the blade 1 and the end surface of the blade 2.

As shown in FIG. 3, in the present embodiment, there is shown the example in which the blade 2 extends in the direction which is orthogonal to the blade 1, however, the structure is not limited to this. It is possible to employ a structure in which the blade 2 extends in a diagonal direction in relation to the blade 1.

As shown in FIG. 3, in the present embodiment, there is shown the example in which the protrusion portion 3 comes into contact with the blade 1 only in its side surface, however, the structure is not limited to this. For example, in a modified example shown in FIG. 7, two blades 1 and one blade 2 are arranged so as to form a Y-shaped form as a whole, and the protrusion portion 3 comes into contact with the end surface of the blade 1 and its peripheral side surface.

As shown in FIG. 3, in the present embodiment, there is shown the example in which the branch sipe branching at one position is formed by combining one blade 2 with one blade 1, however, the structure is not limited to this. It is possible to employ a structure in which a branch sipe branching at a plurality of positions is formed by combining a plurality of blades 2 with one blade 1. In this case, a plurality of protrusion portions 3 are preferably provided between the side surface of the blade 1 and the end surfaces of the blades 2.

The blades 1 and 2 are not limited to the linearly extending shape, but may be formed into a wavy extending shape. The wavy extending blade and a wavy sipe formed thereby are conventionally known. The wavy extending shape mentioned above is preferably applied to a blade extending in a tire width direction, particularly such as the blade 2 according to the present embodiment.

Figure 7:
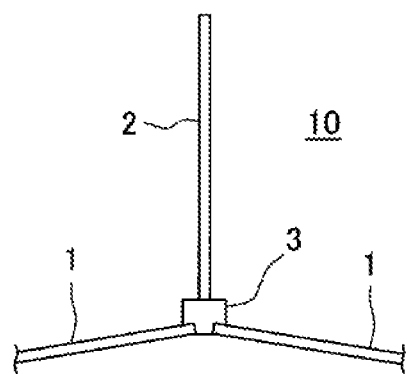
FIG. 7 is a view showing a modified example of a first blade.

A plurality of modified examples mentioned above can be combined and employed without any restriction. For example, the thickness of the protrusion 3 can be changed as shown in FIG. 5 while changing the height of the protrusion portion 3 as shown in FIG. 4. In addition, it is possible to optionally select and employ at least one of the shape of the protrusion portion 3 as shown in FIG. 6, the shape of the blade 1 and the protrusion portion 3 as shown in FIG. 7, and the wavy extending blade 2.

The metal mold M can be manufactured in the same manner as the conventional metal mold manufacturing step only by modifying the steps of arranging the blades 1 and 2 as mentioned above, and setting a concave portion for forming the protrusion portion 3 between the side surface of the blade 1 and the end surface of the blade 2, in the casting mold (for example, the plaster casting mold) which is used for casting the metal mold M.

The tire cure metal mold according to the present invention can be structured in the same manner as that of the normal tire cure metal mold except the provision of the blades and the protrusion portion as mentioned above in the tread forming surface. Further, the conventionally known materials, shapes and structures can be employed in the present invention.

The present invention is not limited to the embodiments mentioned above, but can be variously modified and changed within the range which does not deviate from the scope of the present invention. Therefore, for example, in the embodiment mentioned above, there is shown the example in which the metal mold is constructed by three mold portions, however, the structure is not limited to this. It is possible to employ a structure in which the metal mold is constructed by a pair of mold portions which are separated into two sections at the center of the tread portion. Further, a bead ring fitting a bead portion of the tire may be provided as a separated member in an inner side of the side mold portion in the tire diametrical direction.

What is claimed is:

1. A tire cure metal mold in which a plurality of blades for forming a sipe are provided in a protruding manner on a tread forming surface, the tire cure metal mold comprising:
    a first blade which extends along a first direction;
    a second blade which extends along a second direction intersecting the first direction; and
    a protrusion portion which is formed by a local protrusion of the tread forming surface and comes into contact with a side surface of the first blade and an end surface of the second blade facing to the side surface of the first blade.

2. The tire cure metal mold according to claim 1, wherein the first blade is arranged in an area forming a shoulder land portion line which is positioned in an outermost side in a tire width direction among a plurality of land portion lines, and extends along a tire circumferential direction which is the first direction, and
    wherein the second blade is arranged in an outer side in the tire width direction than the first blade, and extends along the tire width direction which is the second direction.

3. The tire cure metal mold according to claim 1, wherein a thickness of the protrusion portion measured in a thickness direction of the second blade is larger than a thickness of the second blade.

4. The tire cure metal mold according to claim 1, wherein a length of the protrusion portion measured in a length direction of the second blade is equal to or less than 0.7 times of the maximum height of the second blade.

5. The tire cure metal mold according to claim 1, wherein a height of the protrusion portion measured in a tire diametrical direction is equal to or smaller than the maximum height of the second blade.

6. The tire cure metal mold according to claim 1, wherein the protrusion portion comes into contact with the end surface of the second blade and its peripheral side surface.

7. The tire cure metal mold according to claim 1, wherein a height of the protrusion portion measured in a tire diametrical direction is fixed along a length direction of the second blade.

8. The tire cure metal mold according to claim 1, wherein a height of the protrusion portion measured in a tire diametrical direction is enlarged toward the second blade.

9. The tire cure metal mold according to claim 1, wherein a thickness of the protrusion portion measured in a thickness direction of the second blade is fixed along the length direction of the second blade.

10. The tire cure metal mold according to claim 1, wherein a thickness of the protrusion portion measured in a thickness direction of the second blade becomes smaller toward the second blade.

* * * * *